United States Patent

Ocondi

[11] Patent Number: 5,983,164
[45] Date of Patent: Nov. 9, 1999

[54] METHOD AND APPARATUS FOR MEASURING AND CONTROLLING THE FLOW OF NATURAL GAS FROM GAS WELLS

[75] Inventor: Cham Ocondi, Aurora, Colo.

[73] Assignee: Stella, LLC, Aurora, Colo.

[21] Appl. No.: 09/030,275

[22] Filed: Feb. 25, 1998

Related U.S. Application Data

[60] Provisional application No. 60/039,125, Feb. 25, 1997.

[51] Int. Cl.$^6$ .................................................. G06F 19/00
[52] U.S. Cl. ................................................................ 702/12
[58] Field of Search .................................. 702/50, 55, 6, 702/12; 137/155; 340/856.3; 175/50, 48; 166/250.01, 250.15, 66, 66.6, 53; 73/152.29, 152.51, 152.52, 861.03

[56] References Cited

U.S. PATENT DOCUMENTS

| | | |
|---|---|---|
| 4,150,721 | 4/1979 | Norwood . |
| 4,568,933 | 2/1986 | McCracken et al. ................. 73/152.29 |
| 4,633,954 | 1/1987 | Dixon et al. . |
| 4,799,169 | 1/1989 | Mims ................................... 73/861.03 |
| 4,989,671 | 2/1991 | Lamp . |
| 5,132,904 | 7/1992 | Lamp . |
| 5,172,717 | 12/1992 | Boyle et al. .............................. 17/155 |
| 5,253,713 | 10/1993 | Gregg et al. . |
| 5,597,042 | 1/1997 | Tubel et al. ......................... 166/250.01 |
| 5,706,896 | 1/1998 | Tubel et al. . |
| 5,785,123 | 7/1998 | Lea, Jr. . |
| 5,803,167 | 9/1998 | Bussear et al. . |

Primary Examiner—Donald E. McElheny, Jr.
Attorney, Agent, or Firm—Donald W. Margolis

[57] ABSTRACT

This system and Method serve as both a raw data logger for well operation analysis and a well event logger for well performance analysis. An improved methodology of remote event and process variable logging and data retention designed specifically to address the needs of intermittently flowing gas wells is useful for eliminating gas slippage associated with intermittent or erratic gas flow conditions, eliminating measurement errors, and lowering operating costs. The well data can be scanned in seconds for its current flow situation, and as a set of specific conditions are met, a built-in control program reacts to those conditions by shutting down the well until certain pressure criteria are met to allow the well to flow again. To maintain measurement integrity, precise event logging of the valve positions to indicate the actual flowing period are included in the flow integration. There are auto-calibration and reintegration features in the system methodology for eliminating slippage gas and eliminating settling disputes between the producer and the pipeline operator. Graphical presentation of event logs and process variable data allows the user to quickly and effectively diagnose and correct gas well problem. The same graphical presentation provides visual inspection and analysis to optimize gas well production.

16 Claims, 4 Drawing Sheets

METHOD AND APPARATUS FOR MEASURING AND CONTROLLING THE FLOW OF NATURAL GAS FROM GAS WELLS

RELATED U.S. APPLICATION DATA:

This application claims the benefit of and is a continuation in part of U.S. Provisional Application Ser. No. 60/039,125, filed Feb. 25, 1997, for IREC METHODOLOGY.

BACKGROUND OF THE INVENTION

1. Field of the Invention

This invention relates to systems and methods for measuring volume and rate of gas well flow by electrical means using differential pressure with time integration. More specifically it relates to an improved methodology for resolving measurement slippage associated with intermittent or erratic flow conditions in order to enhance accurate gas well flow measurement. In addition it relates to a method for improving gas flow control, and concomitant to that, optimum gas reservoir recovery.

2. Description of the Related Art

Because the majority of gas wells are in a decline stage, and therefore flow intermittently, the conventional mechanical chart recording and electronic flow measurement inventions are inaccurate. The gas industry acknowledges that as much as 20 percent of natural gas production is not accounted for, and therefore not paid for, because of the inadequacies of the existing measurement systems. These inadequacies are primarily due to the fact that the majority of gas wells flow intermittently, while existing flow measuring mechanical circular chart recording and electric computer systems are designed to measure continuous flow. Currently, these mistakes cannot be corrected because the existing measurement systems do not provide raw data for an audit-trail for use in recalculating possible errors due to interpretations nor do they in any other way reproduce the actual flow results. Furthermore, in both of the state-of-the-art measurement systems, the recorded data which is available can be manipulated by either the gas producers or the gas purchasers in their favor. As is further detailed below, these measurement errors and the inability to fairly and reliably audit or correct them, are the main cause of disputes between gas producers and gas purchasers. In addition, the lack of audit-trail or analytical quality gas flow trending data which could provide historical profiles of gas reservoir and gas flow performance for each well prevents the gas producer from achieving effective control and optimization of the gas well. The lack of analytical quality trending data leads to faulty gas production practices, and as a result, most gas well reservoirs are poorly managed, and fail to allow for well production optimization.

The most commonly used gas flow measurement system is the mechanical multi-pen chart recorder system. It adequately meets the gas industry's flow measurement needs for accounting purposes if the well flows at a stable, constant rate. However, this situation is rare, due for example, to intermittent gas flow, line surging, and mechanical vibration at the chart, each of which can cause a solid band of ink on the chart, thereby obscuring the actual gas flow, and resulting in gas flow measurement slippage, i.e. improperly measured gas flow. Even in the absence of those conditions, the thickness of the ink track on the chart may cause errors of as much as 30 minutes. Furthermore, because of their lack of adequate detail, and because each person who integrates a chart will do it differently, since no raw data is available, circular charts are incapable of providing a reliable audit-trail. These and other short comings make chart recorders inadequate to provide accurate gas !low data, especially for wells with erratic gas flow, plus they provide no well control options.

With the recent advancements of computer technology, electronic flow measurement (EFM) systems which are capable of frequent sampling and flow integration have begone to be used to replace the circular chart and mechanical flow integration systems. However, the on-site EFM systems introduce different problems that may result in gas flow measurement slippage. First, it must be understood that EFM systems calculate gas flow based on data generated by transducers that convert line pressure, differential pressure and the temperature of the gas flow into electrical signals of about 1 to about 5 volts. These three variables are then converted to engineering numbers and are the basic gas flow variables used to determine gas flow volume using the industry wide accepted formula of the American Gas Association (AGA-3). These basic variables which are used in EFM systems at an on-site, i.e., remote, calculating computer provide some improvement in overall accuracy and timeliness of gas flow measurement, as compared to mechanical multi-pen chart recorder systems, but they create a new set of problems in accurately measuring intermittent gas flow. These problems include the total reliance on the signal from the differential transducer to determine the flow/no-flow condition of the well for gas pressure, because 0 inches differential pressure does not necessarily mean that there is "zero" or "no gas flow" without actual knowledge or determination of actual gas flow. Without going into excessive details herein, an EFM system calculates and accumulates an hourly average flow volume so long as both the line pressure and differential pressure are positive. In addition, for the EFM system to be accurate in flow integration of erratic or intermittent flow, the transducer must be unconditionally infallible, and the gas flow in an ideal condition of no turbulence. This ideal condition does not exist in nature, because, as the gas flow rate approaches or falls below a predetermined level, say 10 inches (of water pressure) of differential pressure, the relationship between the differential pressure and the actual flow becomes erratic. At that point, these systems are not reliable because they rely on a preset moving differential pressure zero (zero cut-off) reference to establish the integration or flow period. For reasons set forth in the STELA™ METHODOLOGY brochure, the accuracy of the typical EFM transducer can be in error by about 0.25% because of total accuracy and transducer drift. Typically, an EFM system sets the calibration of the transducer at, say exactly 1 volt for 0 inches of differential pressure, and the transducer reading can be in error by as much as say about 0.5 inches. Since the flow calculation is reliant on a differential pressure reading to establish a flow condition, this error causes problems. As a result, the gas flow could be shut off, while the EFM system continues to compute about 50,000 cubic feet of gas per day, and conversely, the flow could actually be 50,000 cubic feet per day, yet the transducer might indicate 0 inches of differential pressure, with the result that the EFM system would calculate no flow.

Furthermore, the current, but misguided, logic says that the accuracy of the flow computing system is based on the accuracy of the EFM flow transducers which measure line pressure, differential pressure, and temperature and the frequency and speed of the calculations. However, accuracy really depends on precise awareness of the integration period, that is, knowing when true flow/no-flow conditions occur and knowing the true differential pressure based on a dynamically adjusted true zero. Currently, it is a common practice of the pipeline operator to assume that the no-flow point must be established at a certain positive differential pressure value, which incidently ensures that any slippage is in favor of the purchaser. However, the imposition of such a zero cut-off prematurely cuts off flow calculation while the well is still flowing. This is the major cause of measurement slippage in EFM systems. Under other conditions, the zero base flow could also shift positively, and without a zero cut-off, show a difference of 20%.

The EFM systems convert all engineering values of flow variables, calculate, and store hourly flow volumes at the well head location, which is usually remote from the central operations office. Typically the raw data of the basic flow parameters are discarded during integration, thereby eliminating the audit trail capability of this system. Consequently, the raw data needed for reintegration is unavailable. As a result, recalculation of the local hourly averaged data will not match the average of the integrated flow result because of the square-root effect in the flow formula of the American Gas Association (AGA-3). That is, the sum of the square-root will equal the square root of the sum only if the line pressure and differential pressure remain constant, but in nature these pressures are not (constant in most wells. This lack of audit trail requires the field personnel to enter all of the calibration factors arid all data needed for the AGA-3 flow calculation before activation of the on-site EFM systems. This information along with the transducer readings allows the on-site computer to calculate flow. The result is an average hourly flow, even if the well was only open 30 minutes, that cannot be recalculated because the raw data has not been stored. Erroneous integrated results due to incorrect entry of the above data, are found to be very difficult to correct.

Not only is unintentional human error likely with the EFM systems, but, as set forth in the STELA™ METHODOLOGY brochure, the possibility of intentional manipulation exists. The hourly managed data provided by the EFM system further obscures the analytical quality data needed by the producer to operate and manage the production of the well.

SUMMARY OF THE INVENTION

It is thus an object of the present invention to provide a method and system which is specifically designed to solve the gas flow measurement and control problems of the prior art chart and EFM systems.

It is another object of the present invention to provide to meet the two main objectives for gas well flow measurement and control of providing analytical quality data and event logs for production optimization, also to provide analytical quality data and event logs for accurate gas flow integration with complete audit-trail, and to leave gas well operational control to the field personnel and keep the accounting procedures in a central office.

The present invention specifically overcomes the disadvantages in the prior art discussed above. The method in accordance with the present invention basically includes at least a "remote component system" and a "host component system". The remote component system is located at the well head location, and is usually remote from the central operations office at which the host component system is located. The remote component system basically includes some form of electronic computer data logger, such as an electronic chart recording system. The electronic data logger of the remote component system is connected to transducers which measure and transmit line pressure, flow differential pressure, and temperature, all as analog data. In preferred embodiments, the remote component system is also connected to transducers which measure and transmit the gas well casing pressure and the pressure of the tubing immediately adjacent to the well head, also as analog data. The remote component system electronic data logger includes software to trend the analog data accurately, and a memory system to store in a retrievable format, as a function of time, the analog data so collected. To maintain measurement integrity the memory system also stores and logs digital data of precise events, such as valve positions, to indicate the actual period of gas flow, all as a function of time. The remote component system also includes a mechanism for transmitting, using a data compression technique, both analog trending and event log digital data to the host component system, which is normally located at the central operations office, upon request.

The system and method of the present invention is designed to specifically address the needs of the intermittently flowing well. It has no time span limitations. The well can be scanned from the host component system location in seconds for its current flow parameters, and, as a set of specific conditions are met, a control program can be caused to react to those conditions, for example under conditions of low flow pressure, by shutting down the well until certain pressure criteria are met, and then allowing the well to flow again. A computer program assists in the calibration of the sensors that monitor the vital temperatures and pressures of the well, thereby also minimizing maintenance cost. The auto-calibration and reintegration features in the system of the present invention methodology eliminate the problems due to the failure to accurately measure slippage gas, and can thereby either eliminate or provide data for use in settling disputes as to gas volume between the gas producer and the pipeline operator. The host software can also be loaded into a notebook computer and allows the user the portability of using the system in the field.

These and other objects of the present invention will become apparent to those skilled in the art from the following detailed description and accompanying drawings, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings which are incorporated in and form a part of this specification illustrate complete preferred embodiments of the present invention according to the best modes presently devised for the practical application of the principles thereof, and in which.

DETAILED DESCRIPTION OF THE INVENTION

Figure 1:
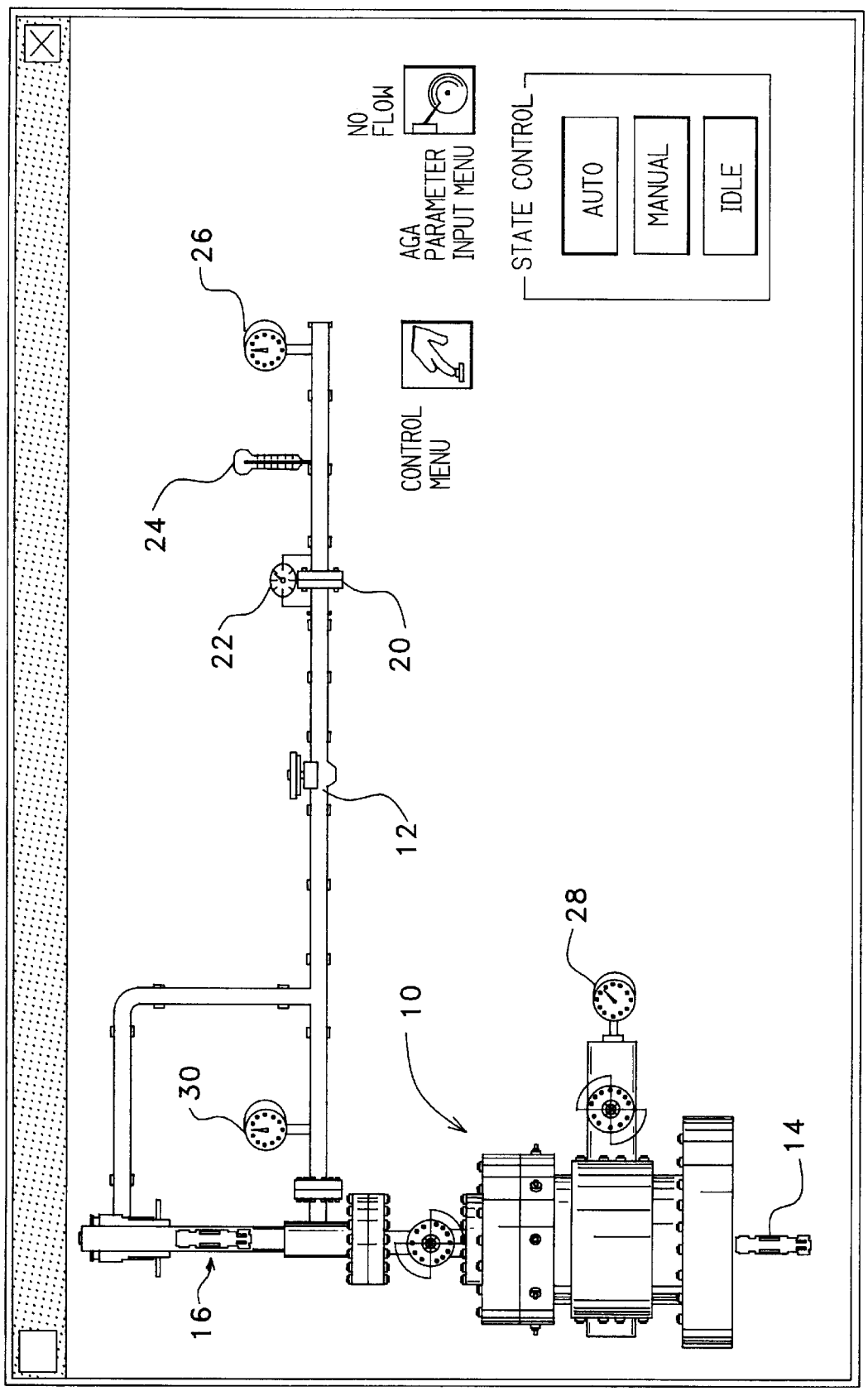
FIG. 1 is a schematic representation of gas well head incorporating transducer elements of the remote component system.

For the purposes of promoting an understanding of the principles of the present invention, reference will now be made to the embodiments and alternatives illustrated in the drawings, and specific language will be used to describe the same. It will nevertheless be understood that no limitation of the scope of the present invention is thereby intended. The embodiments illustrated and explained are exemplary only. Like reference numerals are used to designate similar structures in the views of the various figures. Alterations and modifications of the illustrated apparatus and methods, and such further applications of the principles of the present invention as illustrated therein being contemplated as would normally occur to one skilled in the art to which the present invention relates are intended to be within the scope of the present invention.

Referring first to FIG. 1, a schematic representation of gas well head, generally 10, incorporating various transducer elements of the remote component system, and from which the typical blow down and separator elements have been removed for simplicity of exposition. Various pressure and temperature data is shown for representative purposes only. When the well is closed by valve 12, plunger 14 is normally at the bottom of the well tubing, not shown, but when valve 12 is opened, plunger 14 rises through the well tubing to the plunger arrival location 16 to push water, salt water, hydrocarbons and mixtures thereof from the tubing for disposal at blow down and separator elements, not shown. Gas can then flow through tubing 18 through to orifice 20 to provide a differential pressure reading at transducer 22, in the manner which is well known in the art. Downstream of orifice 20 are standard temperature transducer 24 and standard static line transducer 26. In addition, a casing pressure transducer 28 is connected to the well head at the top of the casing, not shown, and tubing pressure transducer 30 is located downstream of well head 10, but upstream of orifice 20.

Figure 2:
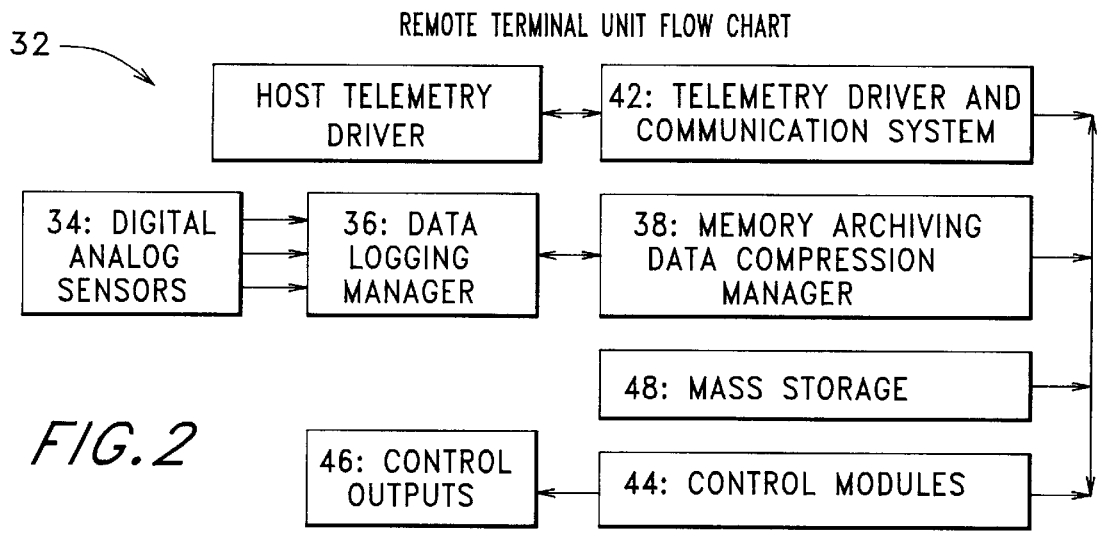
FIG. 2 is a simplified flow-chart of the remote component system of the present invention.
Figure 3:
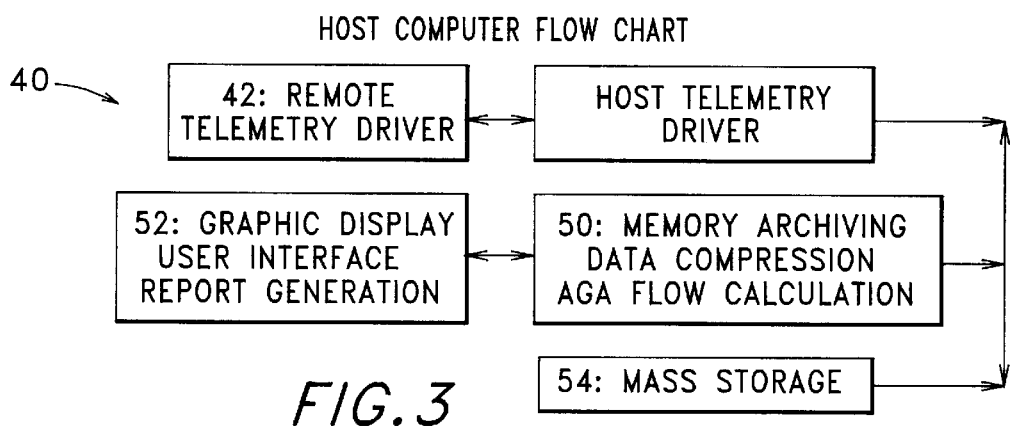
FIG. 3 is a simplified flow-chart of the host component system of the present invention.

Now referring to the simplified flow-chart of FIG. 2, the operation of the remote component system, generally 32, of the present invention will be explained. Analog and digital data is transmitted from transducers 22 (differential pressure reading), 24 (temperature transducer), 26 (static line transducer), 28 (casing pressure transducer) and 30 (tubing pressure transducer) are electrically connected to input device 34, and thence transmitted to data logging manager 36 for storage on any media, and for further transmission to memory archiving data compression and data management system 38. The compressed data is then transmitted to the host component system, generally 40, see FIG. 3. Transmission may be by remote telemetry system 42, as shown, or by direct wiring, which is normally not practical in view of the vast distance between the gas wells and the central operations office. Remote telemetry system 42 may most efficiently operate by means of a wireless or conventional phone line system, although other state-of-the-art transmission means, such as satellite transmission, may be used.

In preferred embodiments the data management system 38 can be programmed to activate control modules 44 to activate control outputs 46 to, for example, open and close valves in real time to optimize well output. The activation of control module 44 and control output 46 may be remotely controlled by telemetry from host component system 40.

Figure 4:
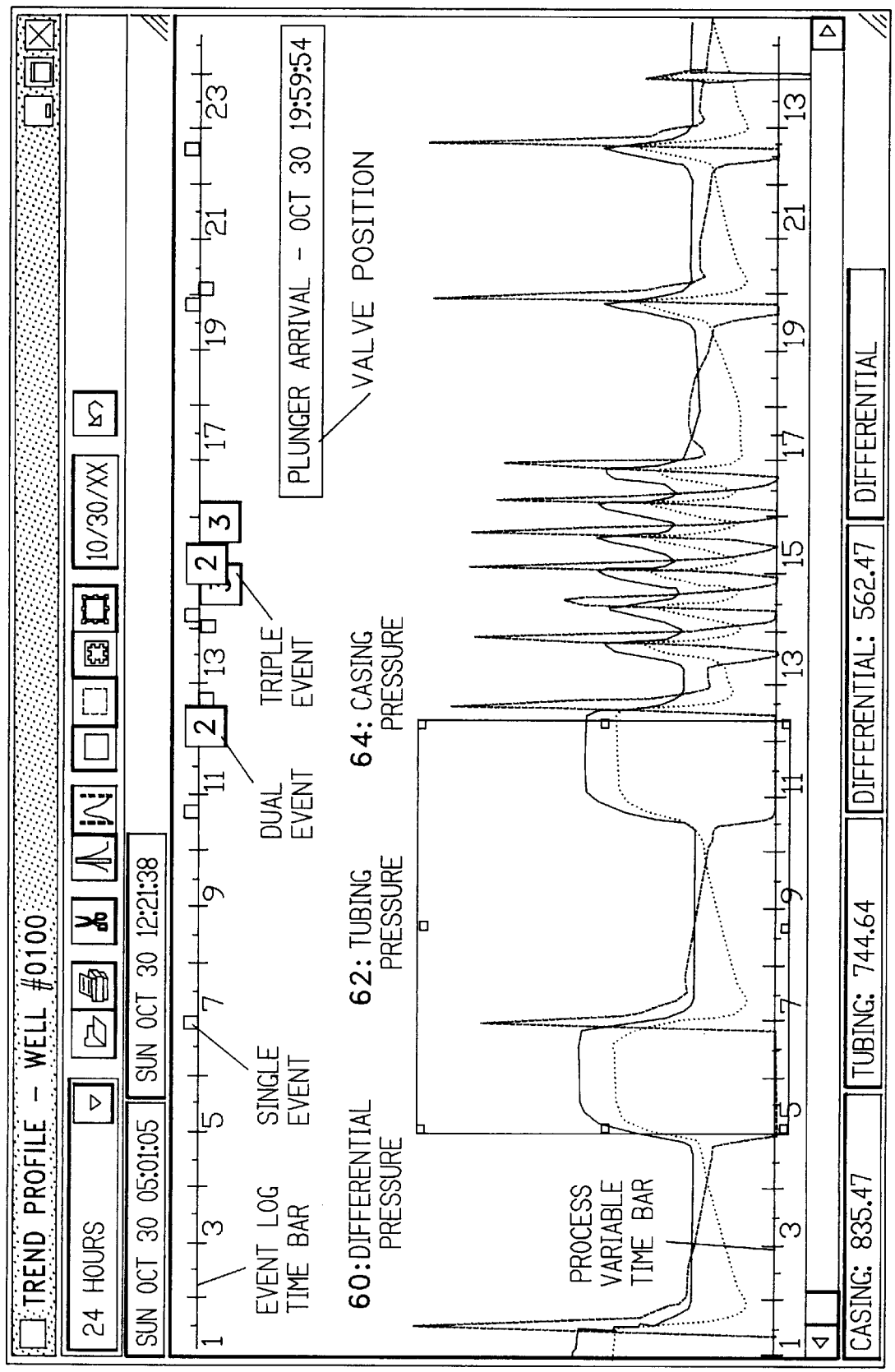
FIG. 4 is an example of the system of the present invention Trend screen.

Referring again to flow-chart FIG. 2, the remote component system of the present invention will continue to scan and save all active analog data received from transducers 22, 24, 26, 28 and 30 at a preset interval. As explained above, the data will be compressed and stored both in short term memory archiving data compression and data management system 38, for say about a one month duration, and optionally, in preferred embodiments, in a mass storage system 48, using state-of-the-art storage devices may be used to store data from the remote component system for the life of the well. One such preferred mass storage device is a PCMCIA card with up to 100 MB capacity or about 50 years of data storage. Event logs of digital status changes or software status changes will be time stamped and stored in Event log files. Referring now to flow-chart FIG. 3, the host component system of the present invention includes a telemetry driver 48 for receiving data from and sending data to telemetry driver 42. this data is then processed through memory archiving data compression AGA-3 flow calculation processor 50 from which it can be evaluated, for example in preferred embodiments by displaying it as a graphic display on graphic display user interface report generation monitor/input device 52. A representative example of the trend screen of the system of the present invention is shown in FIG. 4, and is discussed in additional detail below. As explained above, the data will be stored both in short term memory in module 50, again for say about a one month duration, and optionally, in preferred embodiments, in a host mass storage system 54, again using state-of-the-art storage devices.

In preferred embodiments, the system of the present invention host component system 40 includes a computer, say a personal computer running, for example Windows software, say versions 3.1 and higher, capable of uploading data from the system of the present invention remote component system 32, as well as downloading control strategies back to the remote component system 32, again by means of a wireless or conventional phone line system, for example. Specifically designed computer software, a sample of which is submitted with this application as computer microfiche, allows the host component system to splice the trending data seamlessly for the life of the well. The latest versions of AGA-3 and AGA-8 may be loaded along with software to handle flow calculation to determine gas flow volume. This provides an effective way to recalculate the gas volume for any time period using modified parameters or scaling factors, thereby providing a means which can be used to settle volume disputes between producers and pipeline operators. The system of the present invention host component system is essentially an electronic chart integrator with no retracing or human intervention required, thereby having high reproducibility, and no opportunity for human error. The raw database is maintained as a permanent record or audit-trail of the well.

The flow integration software is based on the event logging of the positions of valve 12, which controls the gas flow based on downloaded control strategy from the host component system 40 to determine when to start and stop flow calculation. The zero differential pressure, i.e. the millivolt reading of raw data before the valve is open, is used to scale the differential pressure values of the cycle. The differential pressure span uses the latest calibrated or manually input value as it displays on the event log of the calibration table. This application of the event logs to determine the flow period and the establishment of the actual differential pressure zero base of each flow cycle constitutes a system that eliminates gas measurement slippage caused by differential pressure zero shifting. Also the software allows insertion of the new parameters of scaling factors, gas composition, and basic flow data, thereby providing another invention that effectively expedites the reintegration process to settle any disputes between the producer and the pipeline operator.

The trend screen of FIG. 4, displays both analog data or process variable trends and the digital event logs along with records of calibration and control-strategy changes, provides critical historical data to effect production optimization. Time bars located at both the top and bottom of the screen can be scrolled to display data for the desired period. The top time bar displays the event logs by means of data blocks. Data blocks can be color coded for easy recognition. If more than a single event occurs at the remote location at the same time, the number of events which have occurred are displayed on a data block, i.e. "2" and "3" as shown at the top time bar. Icons to expand and contract the time scales are provided for the user to analyze and diagnose all the process variables on the trend screen.

Markers can be inserted on the screen, and the time span thus marked can be scrolled. Analog data is shown to be displayed beneath the bottom time bar, and event data is shown to be displayed along the top time bar. The display feature with the dual time bars to correlate the process variable and the event logs constitute an invention. The well control program will be activated only after the applicable control software and all configurable control parameters are downloaded from the host component system. The remote component system is equipped with control capability to modify a motorized choke, not shown, or to operate a bi-stable form of a solenoid valve 12 to control the flow of gas delivered to the pipeline. A motorized choke can be used to control a gas well production above 200 MCFD and bi-stable solenoid valve 12 is more effective for controlling a gas well with less than 200 MCFD. Also an alarm software package, allowing the remote component system to initiate transmission of an alarm message to the host component system 40 is a built in feature of the system. A state-of-the-art telemetry package is also provided to allow data exchange with a host component system computer loaded with the system of the present invention host component system software package.

Referring again to FIG. 4, when a gas well 10 is initially open to production, an inrush of gas will produce a sharp rise of the differential pressure 60, but static line pressure will remain unchanged. An immediate drop of both the tubing pressure 62 and casing pressure 64 will then be noted. After a flowing period, the casing pressure will slowly rise in response to liquid moving up through the tubing. A wide variation between the tubing pressure 62 and casing pressure 64 shows continued liquid build up. When the differential pressure 60 reaches a predetermined control limit valve 12 is closed to stop the gas flow. After valve 12 is closed and kept close, both the tubing pressure 62 and casing pressure 64 will increase until they reach stable points.

Referring again to FIG. 4, to the time upstream just before 12th hour, process variables differential pressure 60, tubing pressure 62. and casing pressure 64, show a characterization or signature of an pre-optimized well. After the 12th hour control parameter was downloaded to the remote system the characteristic of 60, 62, and 64 show the characteristic of the well trying to stabilize after a new control parameter was installed. The well characteristic after 16th hour, shows a stabilization of differential pressure 60, tubing pressure 62, and casing pressure 64 and this will become an optimized signature of the well. This optimized characterization will remain for a period of several months or longer.

Tubing pressure 62 can be used to diagnose leakage between the well head 10, separator (not shown) and line pressure 26. If leakage occurs, the tubing pressure profile will show a decline after the well is shut.

The above control strategies allow the well to produce gas at a rate that matches the ability of the reservoir and the line 18 or head 10 pressure. The event logs of the control strategies and the presentation of the process variable give the operator an effective tool to determine the optimum production control strategy for each well. The trending data produced by the process of the present invention shows if the well is optimized. Most wells, if properly optimized will remain optimized for at least several months. Since most wells have their own unique signature or trending profile, a trained operator can quickly diagnose any problem well through visual inspection of its trending profile.

Figure 5:
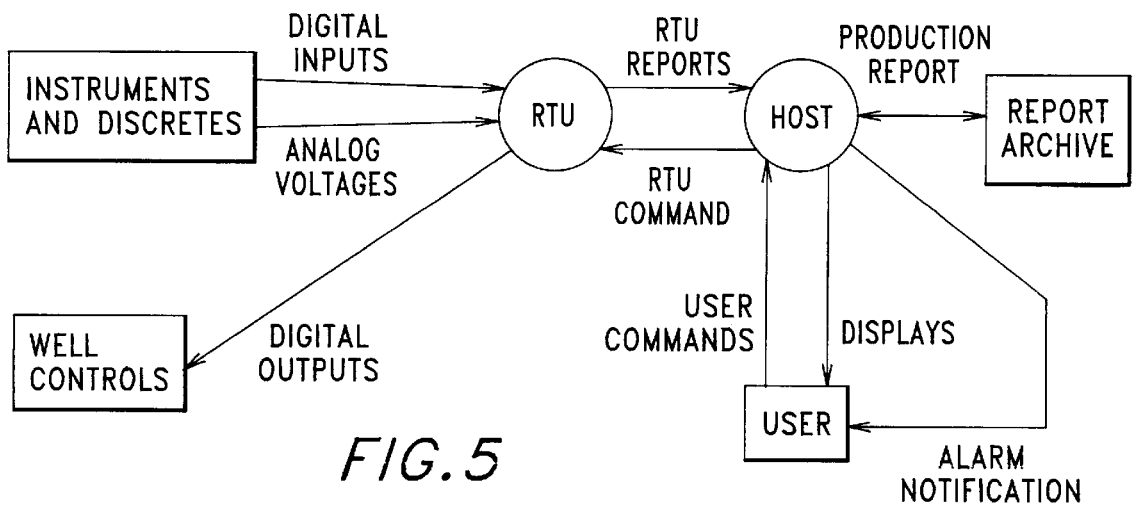
FIG. 5 is a flow-chart of an alternative embodiment of the remote component system of the present invention.
Figure 6:
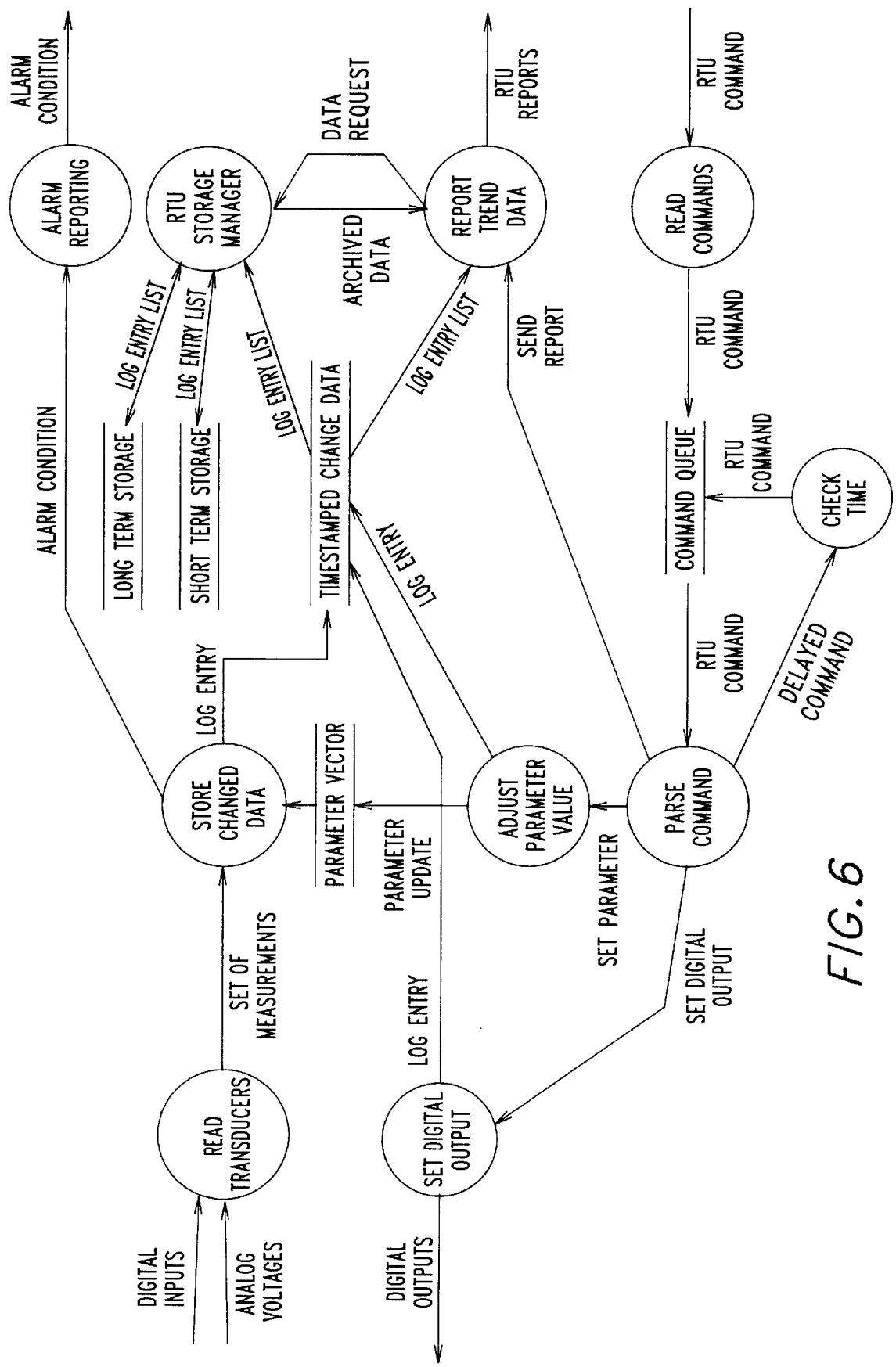
FIG. 6 is a flow-chart of an alternative embodiment of the host component system of the present invention.

FIGS. 5 and 6 are flow-charts of an alternative embodiment of the remote component system and the host component system of the present invention.

In the operation of the present invention, at a gas well head 10 at a remote well site transducers, and more specifically at least a differential pressure transducer 22, a temperature transducer 24 and a static pressure line transducer 26 are placed in analog electric signal transmission connection with a remote component system 32 installed at that remote well site. In preferred embodiments, casing pressure transducer 28 and tubing pressure transducer 30 are also placed in analog electric signal connection with the same remote component system 32. Remote component system 32 is commissioned with all of the calibration, gas flow parameters, and control configurations needed to operate the process of the present invention, for example in the form of the STELA software listing submitted herewith and incorporated herein, as though set forth in its entirety. The input device 34 scans, monitors and receives analog electric data signals from at least the differential pressure transducer 22, temperature transducer 24 and static pressure line transducer 26, as well any other transducers associated with the well head area 10 and linked to the remote component system 32. The remote component system 32 also receives digital electric event data signals from associated not shown end-devices such as a state-of-the-art tank level sensor, not shown, a state-of-the-art valve position sensor, a state-of-the-art plunger arrival sensor, and the like.

This data is then electrically sent to input device 34, and thence transmitted to data logging manager 36 both for short term storage, and in preferred embodiments, for further transmission to memory archiving data compression and data management system 38. As detailed below, the compressed data is then transmitted to the host component system 40, see FIG. 3, for example by remote telemetry system 42 for further processing. In preferred embodiments data management system 38 is programmed to activate control modules 44 to activate control outputs 46 to, for example, open and close gas head 10 well valve 12 in real time, rather than on an arbitrary schedule, thereby optimizing gas output from the well, and thereby, increasing both well efficiency and well life. In preferred embodiments the activation of control module 44 and control output 46 is also managed remotely by telemetry from host component system 40. In addition to these functions, In preferred embodiments the remote component system 32 continuously scans, at a preset interval, and saves all active analog data received from transducers 22, 24, 26, 28 and 30, and all digital data received from digital electric event data signal transducers 12 and 16. That data is then compressed and stored both in short term memory archiving data compression and data management system 38, for say about a one month duration, and in preferred embodiments stored in mass storage system 48 for the life of the well. Event data is stored in event logs as retrievable digital data which is time stamped. The data stored in the event log is then used to build up the trend files for both the process variables and event logs, as shown in FIG. 4. Remote component system 32 is in electronic communication with host component system 40. However, it should be noted that the remote component system 32 is fully capable of stand-alone operation. It does not rely op the host to function, and is a typical distributed architecture system design.

Referring again to flow-chart FIG. 3, the telemetry driver 48 of host component system 40 receives data from and sends data to remote telemetry driver 42. Data communication between the host component system 40 and the remote component systems 32 is in serial format, for example via the serial data port of an off the shelf computer and modem device, similar to the Internet system. Since most gas well sites do not have conventional phone outlets, wireless telemetry data is the preferred communication device. This data is then processed through memory archiving data compression AGA-3 flow calculation processor 50 where it is be evaluated, for example, by displaying it as a graphic display on graphic display user interface report generation monitor/input device 52, as shown in FIG. 4, and discussed in detail above. The data is then stored both in short term memory in module 50, and in preferred embodiments, in a host mass storage system 54. Host component system 40 includes a computer which is capable of uploading data from the system of the present invention remote component system 32, as well as downloading control strategies back to the remote component system 32. The specifically designed computer software, again for example in the form of the STELA software listing submitted herewith and incorporated herein, as though set forth in its entirety allows the host component system 40 to splice the trending data seamlessly for the life of the well. The latest versions of AGA-3 and AGA-8 are also loaded along with software to handle flow calculation to determine gas flow volume. This allows the recalculation of gas volume for any time period using modified parameters or scaling factors, and also provides a means which may be used to settle volume disputes between producers and pipeline operators. The system of the present invention host component system is essentially an electronic chart integrator with no retracing or human intervention required, thereby having high reproducibility, and no opportunity for human error. The raw database is maintained as a permanent record or audit-trail of the well.

The flow integration software is based on the event logging of the positions of valve 12 to determine when to start and stop flow calculation. The zero differential pressure, i.e. the millivolt reading of raw data before the valve is open, is used to scale the differential pressure values of the cycle. The differential pressure span uses the latest calibrated or manually input value as it displays on the event log of the calibration table. This application of the event logs to determine the flow period and the establishment of the actual differential pressure zero base of each flow cycle constitutes an invention that eliminates gas measurement slippage caused by differential pressure zero shifting. Also the software allows insertion of the new parameters of scaling factors, gas composition, and basic flow data, thereby providing another invention that effectively expedites the reintegration process to settle any disputes between the producer and the pipeline operator.

In preferred embodiments, communication from with the remote component system 32 to the host component system 40 is on an interrupted mode. But, for example, any alarm at the remote component system 32 is automatically reported to the host component system 40 immediately on a "report-by-exception" basis. The host component system 40 is normally located in a central operating office at which field personnel are present. The host component system 40 is programmed to scan a plurality, or effectively, all of the remote component systems 32 in the field that it is designed to control, to update the trending files of each well, to generate a field wide report of daily gas flow production data, all the related process variables, and any alarm events. This report, normally schedule to print each morning, may be quickly reviewed by the responsible field personnel to identify wells with abnormal conditions, such as alarm situations and unusual production. Analysis of the trends of these abnormal wells allows the responsible field personnel to quickly develop a corrective action plan. For example, some wells may need modified control strategies from the host component system 40 to the remote component system 32. Others may require on site visitation to correct the problems. The trending analysis provide by the system of the present invention also allows the responsible field personnel to take action on a preventive maintenance basis in order to prevent damaging events, such as liquid spillage or freezing pipe from occurring has been proven to be a very beneficial operating tool. In addition, the trending profile also provides diagnostic data to determine if the correct orifice meter size is in use.

Both the producer and the pipeline operator can share the raw database produced by the process of the present invention. The host component system 40 is capable of archiving the raw and integrated flow data for the accounting system of both the producer and tile pipeline operator. To optimize productivity of the gas well, reservoir trending of tubing and casing pressure profiles via casing pressure transducer 28 and tubing pressure transducer 30 are vital data for proper control strategy. To open the well, casing pressure must be allowed to build to a level where it must overcome the line pressure and liquid loading of the vertical tubing, not shown, to induce measurable gas flow. For a high volume gas well, say of over 200 MCFD, a variable choke valve 12 may be used to control the over ranging of the differential pressure and use the energy to extend the gas flow volume. For wells under 200 MCFD, an on-off valve 12 controlled by a state-of-the-art bi-stable solenoid is more effective in unloading the well at a cost of over ranging the differential pressure limit in the initial opening period. Once the differential pressure is detected to fall below about 10 or 15 inches, the remote system may be programmed to stop the gas flow by shutting valve 12. The ability to stop the flow of the well at a high differential value results in more accurate gas flow measurements, and also maintains a healthier gas reservoir pressure.

Accordingly, it is seen that several objects and advantages of the system of the present invention have been achieved:
a) Accuracy. With event logging of the position of the valves and the control software's action, the system of the present invention can pinpoint the exact flow period and, consequently, knows when to integrate data. FIG. 4 shows the display of event-logging of both the analog and digital data. The digital data including open and/or closed valve positions, the arrival time of the plunger, and the time-stamped record of the digital inputs are displayed along with the analog data. Unlike other solutions, this eliminates dependence on differential pressure data to determine on/off or flow/no-flow conditions. The system of the present invention avoids zero-shifting errors by simply stopping the flow calculation when the valve is shut-off. Therefore, the system of the present invention solves the zero shifting problem.

b) Calibration economy. The system of the present invention eliminates the costly calibration procedure of the flow measurement transducers. The system of the present invention achieves software calibration from the PC keyboard instead of on-site adjustment.

c) Data storage capacity. The system of the present invention eliminates storage and archiving limitations of the mechanical chart systems. The system of the present invention can store data for the life of the well. Archiving or searching the raw data trend can be easily accomplished by clicking the appropriate icons or buttons on the computer to select the desired data on the screen.

d) Does not rely on transducers for flow/no-flow determination. In systems that rely on transducers for flow/no-flow determination, the transducer must be absolutely infallible, and the gas flow must be in an ideal condition with no turbulence at the low end, i.e. below 10 inches of differential pressure. These conditions cannot exist because as the gas flow rate approaches or falls below 10 inches differential pressure, the data becomes erratic and unreliable. Also, transducers may lose accuracy over time. Therefore, since the system of the present invention does not rely on transducers, but rather on event logging to indicate precisely when valves are open or closed and the exact time of flow/no-flow periods the data is neither erratic nor unreliable.

e) Zero-shift correction. Unlike the electronic flow measurement systems that rely on the differential pressure sensor for no-flow cutoff, this invention provides computer software written to automatically and dynamically establish the true zero base, and therefore true differential pressure base, before opening the well to production on each intermittent cycle.

f) Retention of raw data. The system of the present invention logs raw analog data of the well's flow variables of line pressure, differential pressure, and temperature. The data are retained in original unscaled millivolt values. Therefore, reintegration with a modified scaling factor and zero base, as well as conversion to engineering values can be easily achieved with software. Measurement disputes can be resolved fairly because the original data can be retrieved and used for recalculation by both parties using the established AGA formulas.

g) Uncompromised audit trail Unlike the currently used chart recorders, the system of the present invention does not need to retrace or manipulate data. The original, raw data are available for the life of the well. Any need for recalculation can be met because the raw databases of line pressure, differential pressure, and temperature are easily accessible.

h) Programmed control instructions. Programmed instructions can shut in the well, in real time, when it falls below the accurate differential pressure range at about 10 inches and/or when other parameters (i.e.liquid loading problems) exist. These control actions maintain the flow at accurate ranges while maintaining a high bottom hole pressure. Exerting control over the principles of gas extraction can extend the life of the reserve while keeping the differential pressure at an accurate flowing rate.

k) Event logging. The event log is a time-stamped record of the digital inputs; for example, the valve open and closed positions or the plunger arrival status. This eliminates the dependence on differential pressure data alone to determine the on-off or flow-no-flow conditions.

l) Full graphical presentation of all vital analog and digital readings on a single screen. The trend screen, for example as shown in FIG. 4, displays color-coded temperature and pressure readings as a graph along the analytical time bar at the bottom of the screen. Corresponding values display in fields below the time bar. This data display provides the vital information needed for flow analysis.

Along the digital time bar at top of the screen, color-coded blocks identify specific well events. Each block marks an event that is logged on the bar at the time it occurs; if multiple events occur at a single time point, the block indicates the number of events. Examples of well events include plunger arrival, changes in valve position, changes in the level of the storage tank that stores produced water and distillate, changes in control parameters, application of AGA-3 parameters, calibration, and others. A message box can be opened at an event block on the trend screen which itemizes each well event in detail. For example, the message for a selected event block might inform the user that the well was shut-in on a specific date and time.

Should data require reintegration, the operator can specify the time span to be reintegrated by using a hairline marker available on the button bar. Data not visible on the screen can be accessed by a scroll button.

The graphical presentation of temperature and pressure data and the digital information available through event log detail provide both optimum flow analysis and indisputable measurement of continuous and intermittent flow.

Unlike the state-of-the-art circular chart recording which covers only eight days, the system of the present invention trend screen, such as in FIG. 5, has no such time limitation and seamlessly displays all process variables, including tubing and casing pressure trending profiles which yield valuable information about the reservoir performance. This invention allows the operator to analyze the well's behavior to determine the best strategy for flow control and elimination of slippage. With the precise stamping of the on-off valve position, the operator does not have to rely on arbitrarily assigned timing periods of opening and closing the well to flow.

Referring again to FIG. 4, this basic version of the trend screen, which is integral to the system of the present invention methodology and software package is used with software which is designed to duplicate the actual characteristics of analog and digital data with respect to time. By means of time stamping, the system of the present invention records the high and low peak values of the analog data for real time analysis. The system of the present invention methodology combines flow parameters of static line pressure, differential pressure, and temperature analog data, and shut-in tubing valve status as digital data, and software control operation to provide an auditable electronic flow measurement system for custody transfer of natural gas. The system of the present invention is capable of resolving measurement slippage associated with intermittent or erratic flow conditions. The system of the present invention also simplifies calibration procedure of the analog instruments because it retains the raw database for software calibration.

In preferred embodiments, the system of the present invention Trend screen provides easy to interpret and analyze color-coded well data. The user selects the analog data to display data such as casing pressure, tubing pressure, line pressure, or differential pressure, line or glycol temperatures, and so on, on the time line at the lower edge of the screen. The user can also select well events to be time stamped, i.e. records of digital inputs such as open and closed positions of the value or plunger arrival status, which are displayed on the time line at the upper edge of screen. With the two displays of analog data and digital data, the user of the system of the present invention methodology has precise measurements of flow, precise knowledge of the exact flow period, the ability to auto-calibrate analog instruments, and the ability to reintegrate raw data when corrections are needed, as for example, calculations based on the wrong size orifice plate or calculations based on erroneous gas parameters, could be easily corrected with this invention.

It is therefore seen that the present invention provides a highly reliable, more accurate, and more economical methodology that can be used to precisely measure flow volume without time span limitations, accurately pinpoint flow and no-flow situations, and retain raw data to ensure accurate reintegration. As a result, producers will benefit because production efficiency relies on the analytical quality of the flow and pressure trending of the well to diagnose production problems and optimize the liquid removal process, producers will benefit by having a tool to effectively plan a preventive maintenance schedule for the well and control the gas reserve. In addition, both the seller and purchaser benefit by being able to resolve disputes over unaccounted-for gas volumes through the reintegration process with full graphical presentation of all vital analog and digital components of the measurement system and a common raw database. The event logging of the digital data of on-and-off conditions of the valve or shut-in end-devices and trending of the flow parameters (static pressure, differential pressure, and temperature analog data) completely eliminate the measurement slippage problem. Because the trending data are unscaled or in the original raw format (millivolt values), reintegration, as well as rescaling flow or other parameters, is accomplished with software. Therefore, any disputes of the calculated flow data of any period can be quickly and easily resolved to the satisfaction of the seller and purchaser.

While the above description contains many specificities, these should not be construed as limitations on the scope of the invention, but rather as an exemplification of one preferred embodiment thereof. Many other variations are possible. For example, the host component system 40 of the present invention may be loaded into a notebook computer having a modem and will allow direct connection with the system of the present invention remote component system from any phone line or cell phone to interrogate or upload-download control strategies from or to the remote component system 32.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein. Accordingly, the teaching of the present invention is intended to embrace all such changes, modifications, and variations that fall within the spirit and broad scope of the appended claims.

The inventions in which exclusive rights are claimed are:

1. Methods for measuring the volume and rate of gas well flow from a gas well head by electrical means to eliminate gas volume measurement errors associated with intermittent or erratic gas flow conditions in a system using a differential pressure transducer, a temperature transducer, and a static pressure line transducer all in operative communication with the gas well head, including the steps of:

providing a first electric component system having an input portion installed in operative communication with a gas well site, said component system having calibration data, gas flow parameters, and control configurations;

transmitting analog electric data as a function of time from at least the differential pressure transducer, the temperature transducer, and the static pressure line transducer to said input portion of said first electric component system;

transmitting digital electric event data as a function of time to the input portion of said first electric component system;

transmitting said analog electric data signals to a data logging manager for storage;

transmitting said digital electric event data signals to a data logging manager for storage; and then presenting said analog electric data and said digital electric event data from said signal for display and for analysis of well characteristics and events from said signals, including volume and rate of gas well flow from a gas well head to which it is in operative communication.

2. The methods of claim 1 wherein said analog electric data and said digital electric event data from said signals are retrievably stored for subsequent use in determining gas volume flow and analyzing data trending.

3. The methods of claim 2 wherein said stored digital electric event data is used to measure the actual gas flow period of said well for any substantially current or previous time for integration of actual gas flow at that time.

4. The methods of claim 2 wherein said stored analog electric data and digital electric event data are used for well control.

5. The methods of claim 2 wherein said stored analog electric data and digital electric event data are used to provide trending data and event logging for use in accurate gas volume flow measurement for any substantially current or previous time.

6. The methods of claim 2 wherein said stored analog electric data and digital electric event data are retrievable for subsequent use in accurately determining or analyzing data trending and gas volume flow for any substantially current or previous time.

7. The methods of claim 2 wherein said stored analog electric data and digital electric event data are used over a period of time and spliced together to form a seamless trending database.

8. The methods of claim 1 wherein a casing pressure transducer and a tubing pressure transducer in operative communication with a gas well site are also placed in analog electric signal connection with said first component system.

9. The methods of claim 2 wherein said analog electric data and said digital electric event data are retrievably stored for subsequent use in a memory archiving data management system for use in accurately determining or analyzing data tending and gas volume flow.

10. The methods of claim 1 wherein a second electric component system with calibration data, gas flow parameters, and control configurations is installed at a distance from the gas well site, and wherein said analog electric data and said digital electric event data are transmitted to said second electric component system for storage and for analysis of well characteristics and events from said signals, including volume and rate of gas well flow from a gas well head.

11. The methods of claim 10 wherein said analog electric data and said digital electric event data are transmitted to said second electric component system using data compression techniques.

12. The methods of claim 10 wherein said presentation of said analog electric data and said digital electric event data for analysis of well characteristics and events is by means of a visual display.

13. The methods of claim 12 wherein said visual display is on a monitor screen.

14. The methods of claim 10 wherein said stored analog electric data and digital electric event data at said second electric component system are used for well control.

15. The methods of claim 11 wherein said presentation of said analog electric data and said digital electric event data for analysis of well characteristics and events is by means of a visual display.

16. The methods of claim 1 wherein said system includes means for automatically calibrating some or all of the transducers as a function of the temperature in the portion of the well head where that transducer is located.

* * * * *